US012525788B2

(12) United States Patent
Tanabe

(10) Patent No.: US 12,525,788 B2
(45) Date of Patent: Jan. 13, 2026

(54) PROTECTOR APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shinichi Tanabe, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 150 days.

(21) Appl. No.: 18/557,211

(22) PCT Filed: Mar. 22, 2022

(86) PCT No.: PCT/JP2022/013231
§ 371 (c)(1),
(2) Date: Oct. 25, 2023

(87) PCT Pub. No.: WO2022/230459
PCT Pub. Date: Nov. 3, 2022

(65) Prior Publication Data
US 2024/0222957 A1 Jul. 4, 2024

(30) Foreign Application Priority Data

Apr. 28, 2021 (JP) ................................ 2021-075549

(51) Int. Cl.
*H02H 7/26* (2006.01)
(52) U.S. Cl.
CPC ..................................... *H02H 7/26* (2013.01)

(58) Field of Classification Search
CPC ............ H02H 7/268; H02H 3/16; H02H 7/26; B06R 16/0207; B06R 16/0215
See application file for complete search history.

(56) References Cited

U.S. PATENT DOCUMENTS 10,819,099 B2 * 10/2020 Maekawa ............. H02J 7/0031
2003/0085618 A1 * 5/2003 Rhodes ............... B60R 16/0207
307/10.1

(Continued)

FOREIGN PATENT DOCUMENTS

JP 2002-280091 A 9/2002

OTHER PUBLICATIONS

International Search Report, Application No. PCT/JP2022/013231, mailed May 24, 2022. ISA/Japan Patent Office.

*Primary Examiner* — Thienvu V Tran
*Assistant Examiner* — Christopher J Clark
(74) *Attorney, Agent, or Firm* — Honigman LLP

(57) ABSTRACT

A protector apparatus is used in a power supply system for supplying power to loads and includes a power path and a relay. The power path includes a first conductive path, which is connected to a first power supply unit, and a second conductive path, which is connected to a second power supply unit. A relay switches the first conductive path and the second conductive path between a permitted state and a cutoff state. The first conductive path is provided with first connecting portions in a protected region from the relay toward the first power supply unit. The first connecting portions of the first conductive path are entirely covered by a protector, and in the protected region, the protector insulates the first conductive path from the periphery of the protector. The second conductive path is connected to the load, which is a load to be protected, out of the loads.

7 Claims, 5 Drawing Sheets

(56) References Cited

U.S. PATENT DOCUMENTS

2018/0174709 A1\* 6/2018 Hagi ................. B60L 15/00
2018/0361961 A1\* 12/2018 Maekawa ............ H01M 10/44
2019/0084504 A1   3/2019 Hashino et al.

\* cited by examiner

PROTECTOR APPARATUS

CROSS-REFERENCE TO RELATED APPLICATIONS

This application is the U.S. national stage of PCT/JP2022/013231 filed on Mar. 22, 2022, which claims priority of Japanese Patent Application No. JP 2021-075549 filed on Apr. 28, 2021, the contents of which are incorporated herein.

TECHNICAL FIELD

The present disclosure relates to a protector apparatus.

BACKGROUND

JP 2019-55686A discloses a wiring structure of a wire harness for connecting a battery and an inverter apparatus.

To simplify installation, it is common to use a configuration where connectors that mate together are provided at connected parts where a wire harness is connected to a device to be connected. When this configuration is used in a vehicle, there are potential issues such as abrasion of the connectors due to vibration or deformation due to exposure to high temperatures. To counteract such issues, there is a known configuration where the wire harness is provided with a relay that immediately cuts off a location where a ground fault has occurred from a load, thereby preventing ground faults on a wire harness from being problematic. With this configuration, it is usually desirable for the relay to perform the cutting off operation as quickly as possible to immediately isolate the location where the ground fault occurred, resulting in concern over increased cost for the relay.

The present disclosure was completed in view of the situation described above and has an object of providing a protector apparatus that suppresses an increase in cost.

SUMMARY

A protector apparatus according to an aspect of the present disclosure is used in a power supply system that supplies power to loads and includes: a power path including a first conductive path, which is electrically connected to a first power supply unit, and a second conductive path, which is electrically connected to a second power supply unit; and a cutoff unit that switches between a permitted state where conduction of electricity between the first conductive path and the second conductive path is permitted and a cutoff state where the conduction is cut off, wherein the first conductive path is provided with a first connecting portion in a protected region, which is a predetermined range from the cutoff unit toward the first power supply unit, the first connecting portion is entirely covered by a protector, and in the protected region, the protector insulates the first conductive path from a periphery of the protector, and out of the loads, a load to be protected is electrically connected to the second conductive path.

Advantageous Effects

According to the present disclosure, it is possible to suppress an increase in cost.

DETAILED DESCRIPTION OF PREFERRED EMBODIMENTS

Figure 1:
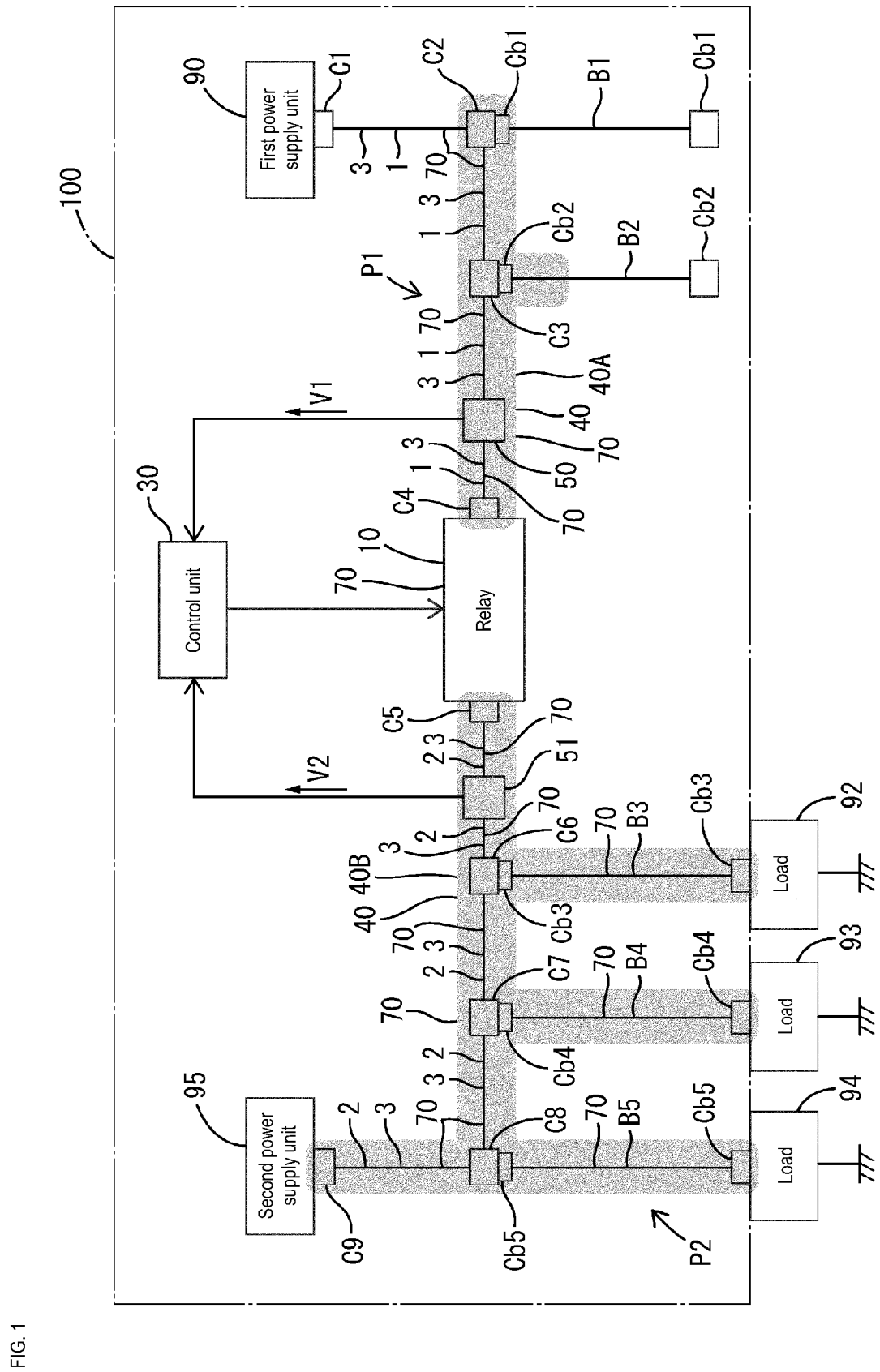
FIG. 1 is a schematic diagram depicting the configuration of a power supply system provided with a protector apparatus according to a first embodiment.

Several embodiments of the present disclosure will first be listed and described in outline. Note that the features of embodiments (1) to (5) indicated below may be freely combined where such features do not contradict each other.

A protector apparatus according to the present disclosure is used in a power supply system that supplies power to loads. The protector apparatus includes: a power path including a first conductive path, which is electrically connected to a first power supply unit, and a second conductive path, which is electrically connected to a second power supply unit; and a cutoff unit that switches between a permitted state where conduction of electricity between the first conductive path and the second conductive path is permitted and a cutoff state where the conduction is cut off. The first conductive path is provided with a first connecting portion in a protected region, which is a predetermined range from the cutoff unit toward the first power supply unit. The first connecting portion is entirely covered by a protector, and in the protected region, the protector insulates the first conductive path from a periphery of the protector. Out of the loads, a load to be protected is electrically connected to the second conductive path.

The first conductive path of the protector apparatus according to (1) above is provided with a first connecting portion in a predetermined range that extends from the cutoff unit toward the first power supply unit, and the first connecting portion is entirely covered by the protector. Since the protector insulates the first conductive path from the periphery of the protector in the protected region of the first conductive path, ground faults are prevented from occurring at the first connecting portion and it is easy to distance the location of potential ground faults from the load to be protected. This means that when a ground fault does occur on the first conductive path, the drop in the voltage applied to the load to be protected, which is connected to the second conductive path, due to the resistance component inherently present on the power path can be suppressed, which makes the load to be protected less likely to stop operating.

The protected region on the first conductive path of the protector apparatus according to (1) above may be continuously covered by the protector.

The protected region on the first conductive path of the protector apparatus according to (2) above is continuously covered by the protector. This means that it is easy to prevent a ground fault from occurring in the protected region and to distance the location of potential ground faults from the load to be protected. Accordingly, when a ground fault does occur on the first conductive path, the drop in the voltage applied to the load to be protected, which is connected to the second conductive path, due to the resistance component inherently present on the power path can be suppressed, which makes the load less likely to stop operating.

In the protector apparatus according to (1) or (2) above, the resistance value of the power path from a position on the second conductive path where the load to be protected is electrically connected to an end portion at the closest position to the load to be protected out of the end portions in the protected region excluding the first connecting portion connected to the cutoff unit is a "first resistance value Ry". A resistance value of the power path from the second power supply unit to a position where the load to be protected is electrically connected to the second conductive path 2 is a "second resistance value Rx". When the output voltage of the second power supply unit is "E" and the guaranteed operating voltage of the load to be protected is "Vs", the first resistance value Ry and the second resistance value Rx may satisfy Equation (1) below.

$$Rx/Ry \le (E - Vs)/Vs \qquad \text{Equation 1}$$

In the protector apparatus according to (3) above, even when a ground fault has occurred at an end portion, which is at a position closer to the load to be protected out of the end portions in the protected region excluding the first connecting portion connected to the cutoff unit, the voltage applied to the load to be protected will be equal to or higher than the guaranteed operating voltage of the load to be protected. This means that the operation of the load to be protected is unlikely to stop. The expression "guaranteed operating voltage" used in this specification is the minimum voltage required for the load to be protected to operate normally.

Part of the second conductive path of the protector apparatus according to any one of (1) to (3) from the second power supply unit to a second connecting portion provided before the cutoff unit may be covered by the protector, and the second conductive path may include a branch path that electrically connects a load and the second connecting portion. The branch path may have a third connecting portion that is electrically connected to the load and is covered by the protector.

The protector apparatus according to (4) preferentially protects the second connecting portion on the second conductive path and also preferentially protects the third connecting portion on the branch path that is electrically connected to a load. By doing so, it is possible to favorably suppress the occurrence of ground faults on the second conductive path side.

The cutoff unit of the protector apparatus according to any one of (1) to (4) above may be a mechanical relay.

With the protector apparatus according to (5) above, even when a ground fault occurs, the load to be protected is likely to keep operating continuously without stopping. It is therefore possible to use a mechanical relay, whose operation is slower than a semiconductor relay, as the cutoff unit. Using a mechanical relay makes it easy to suppress an increase in cost.

First Embodiment

Configuration of Power Supply System

FIG. 1 depicts a power supply system 100 provided with a protector apparatus 70 according to a first embodiment. The power supply system 100 is used as a power supply for supplying electric power to operate loads 92, 93, 94, and the like in a vehicle in which the power supply system 100 is installed. The power supply system 100 includes a first power supply unit 90, a second power supply unit 95, and a protector apparatus 70.

The first power supply unit 90 and the second power supply unit 95 are constructed of DC power supplies, such as a lithium ion battery or a lead acid battery. The output voltages of the first power supply unit 90 and the second power supply unit 95 are 12V, for example.

Configuration of Protector Apparatus

The protector apparatus 70 is used in the power supply system 100. The protector apparatus 70 includes branch paths B1, B2, B3, B4, and B5, a power path 3, the relay 10, which is a cutoff unit, and a protector 40.

As one example, the branch paths B1, B2, B3, B4, and B5 have third connecting portions Cb1, Cb2, Cb3, Cb4, and Cb5, which are each composed of a metal terminal fitting that is covered by a synthetic resin housing, provided at both ends of a harness.

The power path 3 is a path for transferring power between the first power supply unit 90 and the second power supply unit 95. The power path 3 includes a first conductive path 1 and a second conductive path 2. The first conductive path 1 is provided with a plurality of first connecting portions C1, C2, C3, and C4. The first connecting portion C1 is configured to be electrically connectable to the first power supply unit 90. A terminal on the high potential side of the first power supply unit 90 is electrically connected to the first connecting portion C1 on the first conductive path 1. As one example, the first connecting portion C4 is configured as a connector in which a metal terminal fitting is covered by a synthetic resin housing. One end of the relay 10 is electrically connected to this first connecting portion C4. As one example, the first connecting portions C2 and C3 are configured as connectors in which a metal terminal fitting is covered by a synthetic resin housing and to which a mating connector can be detachably attached. The expression "detachably attached" used here includes the ability for connectors to be attached and detached both through the use of a jig and without using a jig. The third connecting portions Cb1 and Cb2 provided at one end of each of the branch paths B1 and B2 are electrically connected to the first connecting portions C2 and C3, respectively.

In the present disclosure, the expression "electrically connected" preferably refers to a configuration where objects to be connected are connected in an electrically conductive state (that is, connected in a state where a current can flow) so that the two objects reach an equal potential. However, the expression is not limited to this configuration, and as another example, "electrically connected" may refer to a configuration where two objects are connected in an electrically conductive state with an electrical component between them.

The second conductive path 2 is provided with a plurality of second connecting portions C5, C6, C7, C8, and C9. The second connecting portion C9 is configured to be electrically connectable to the second power supply unit 95. A terminal on the high potential side of the second power supply unit 95 is electrically connected to the second connecting portion C9 on the second conductive path 2. As one example, the second connecting portion C5 is configured as a connector in which a metal terminal fitting is covered by a synthetic resin housing. The other end of the relay 10 is electrically connected to this second connecting portion C5. As one example, the second connecting portions C6, C7, and C8 are configured as connectors in which a metal terminal fitting is covered by a synthetic resin housing and to which a mating connector can be detachably attached. The third connecting portions Cb3, Cb4, and Cb5 provided at one end of each of the branch paths B3, B4, and B5 are electrically connected to the second connecting portions C6, C7, and C8, respectively.

The loads 92, 93, and 94 are electrically connected to the third connecting portions Cb3, Cb4, Cb5, respectively, which are provided at the other ends of the branch paths B3, B4, and B5. Each of these loads 92, 93, and 94 is configured as a vehicle-mounted load that operates on power supplied from the first power supply unit 90 or the second power supply unit 95. These loads 92, 93, and 94 correspond to by-wire loads, such as a shifting system, a steering system, and a brake system. The magnitudes of the guaranteed operating voltages Vs of the loads 92, 93, and 94 (hereinafter simply referred to as the "guaranteed operating voltages") are Vs1 (V), Vs2 (V), and Vs3 (V).

The relay 10 is disposed between the first power supply unit 90 and the second power supply unit 95. The relay 10 switches between a permitted state where electrical conduction between the first conductive path 1 and the second conductive path 2 is permitted, and a cutoff state in which electrical conduction between the first conductive path 1 and the second conductive path 2 is cut off. As one example, the relay 10 is constructed of a mechanical relay. The relay 10 is configured to allow control by the control unit 30.

The protector 40 includes a first protector 40A and a second protector 40B. The first protector 40A and the second protector 40B are made of synthetic resin. The first protector 40A is formed with a housing in which part of the first conductive path 1 and part of the branch path B1 are housed. The first protector 40A continuously covers a first protected region P1, which is a region including the first connecting portion C4 connected to the relay 10 and the first connecting portions C2 and C3 connected to the branch paths B1 and B2, and is a predetermined range extending from the first connecting portion C4 toward the power supply unit 90. In the protected region P1, the first connecting portions C2 and C3 on the first conductive path 1 are entirely covered by the first protector 40A. In other words, on the first conductive path 1, the protected region P1 is continuously covered by the protector 40. In the protected region P1, the first protector 40A insulates the first conductive path 1 from the periphery of the first protector 40A.

The second protector 40B is formed with a housing inside which the second conductive path 2 and the branch paths B3, B4, and B5 are housed. The second protector 40B continuously covers a protected region P2, which is a region including the second connecting portion C5 connected to the relay 10 and the second connecting portions C6, C7, and C8 connected to the branch paths B3, B4, and B5, and is a predetermined range extending from the second connecting portion C5 to the second connecting portion C9 connected to the second power supply unit 95. In this protected region P2, the second protector 40B insulates the second conductive path 2 and the branch paths B3, B4, B5 from the periphery of the second protector 40B. In this way, on the second conductive path 2, the second connecting portion C9 connected to the second power supply unit 95 and the second connecting portions C6, C7 and C8 connected to the third connecting portions Cb3, Cb4, and Cb5 of the branch paths B3, B4, and B5 are covered by the second protector 40B. The third connecting portions Cb3, Cb4, and Cb5 connected to the loads 92, 93, and 94 on the branch paths B3, B4, and B5 are also covered by the second protector 40B. This means that on the second conductive path 2, the second connecting portions C6, C7, and C8, which are provided between the second power supply unit 95 and the relay 10 and to which the third connecting portions Cb3, Cb4, and Cb5 are detachably attached, are covered by the protector 40.

A first voltage detection unit 50 is interposed on the first conductive path 1. The first voltage detection unit 50 detects a first voltage V1 at a predetermined position on the first conductive path 1 (that is, a position on the first power supply unit 90-side of the relay 10) and provides the control unit 30 with a detection value in keeping with the first voltage V1. The control unit 30 can specify the voltage value at the predetermined position on the first conductive path 1 based on the detection value inputted from the first voltage detection unit 50.

A second voltage detection unit 51 is interposed on the second conductive path 2. The second voltage detection unit 51 detects a second voltage V2 at a predetermined position on the second conductive path 2 (that is, a position on the second power supply unit 95-side of the relay 10) and provides the control unit 30 with a detection value in keeping with the second voltage V2. The control unit 30 can specify the voltage value at the predetermined position on the second conductive path 2 based on the detection value inputted from the second voltage detection unit 51.

The control unit 30 is mainly composed of a microcomputer, for example, and includes a computation device such as a central processing unit (CPU), a memory such as read only memory (ROM) or random access memory (RAM), an A/D converter, and the like. The control unit 30 performs control to turn on the relay 10. The relay 10 is turned on to enter the permitted state where conduction of electricity between the first conductive path 1 and the second conductive path 2 is permitted. The control unit 30 also performs control to turn off the relay 10. The relay 10 is turned off to enter the cutoff state. In the cutoff state, the relay 10 does not pass current in either direction (that is, a direction toward the first conductive path 1 and a direction toward the second conductive path 2), and in this state, the conduction of electricity between the first conductive path 1 and the second conductive path 2 is completely cut off.

The control unit 30 is configured to receive inputs of the first voltage V1 on the first conductive path 1 and the second voltage V2 on the second conductive path 2 from the first voltage detection unit 50 and the second voltage detection unit 51, respectively. The control unit 30 detects abnormalities, such as ground faults, that have occurred on the first conductive path 1 and the second conductive path 2 based on the first voltage V1 and the second voltage V2 inputted from the first voltage detection unit 50 and the second voltage detection unit 51, respectively. As one example, the control unit 30 is configured to compare a detection value in keeping with the first voltage V1 from the first voltage detection unit 50 and a threshold stored in its own memory. As one example, when the control unit 30 determines that the detected value is equal to or less than the threshold, the control unit 30 turns off the relay 10. The control unit 30 also compares a detection value in keeping with the second voltage V2 from the second voltage detection unit 51 with a threshold stored in its own memory and can perform control to turn off the relay 10 on determining that the magnitude of the detection value is equal to or less than the threshold.

Operation of Protector Apparatus

Next, the operation of the protector apparatus 70 will be described by way of an example case where the load 92 out of the loads 92, 93, and 94 is a load to be protected. The load 92, which is the load out of the loads 92, 93, and 94 to be protected, is electrically connected to the second conductive path 2. Here, the expression "load to be protected" refers to a load for which it is desirable to keep the magnitude of the applied voltage equal to or higher than the guaranteed operating voltage when a ground fault has occurred.

Figure 2:
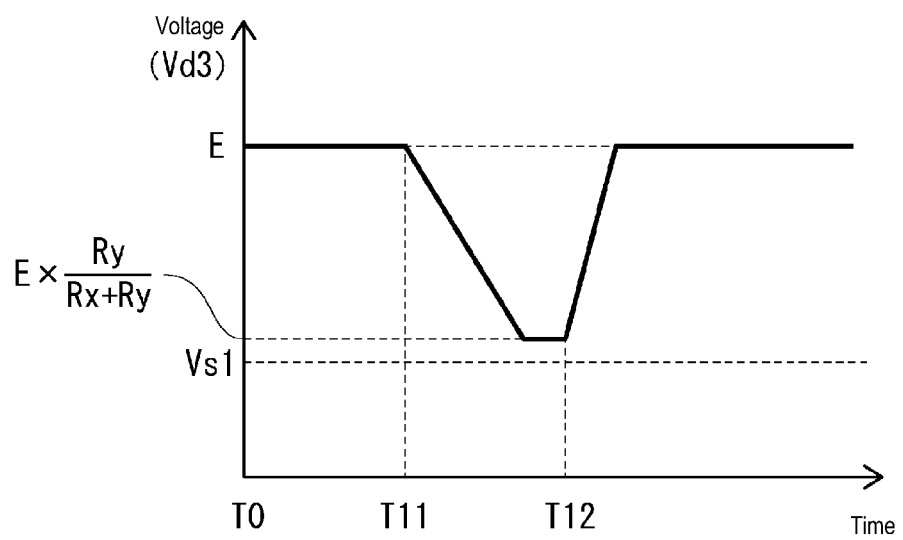
FIG. 2 is a graph depicting changes in voltage at a second connecting portion on a path that supplies power to a load to be protected when a ground fault has occurred on a branch path on a first conductive path side of the power supply system provided with the protector apparatus according to the first embodiment.

As one example, as depicted in FIG. 2, the output voltage E(V) from the second power supply unit 95 is applied from time T0 to the second connecting portion C6 (that is, the second connecting portion that supplies power to the load to be protected). After this, a ground fault occurs at time T11 on the branch path B2 (see FIG. 2). The potential at the position where the ground fault occurred on the branch path B2 reaches the same potential as the ground potential V0 of the vehicle (see FIG. 2). From time T11 onward, the voltage at the second connecting portion C6 decreases sharply.

Figure 3:
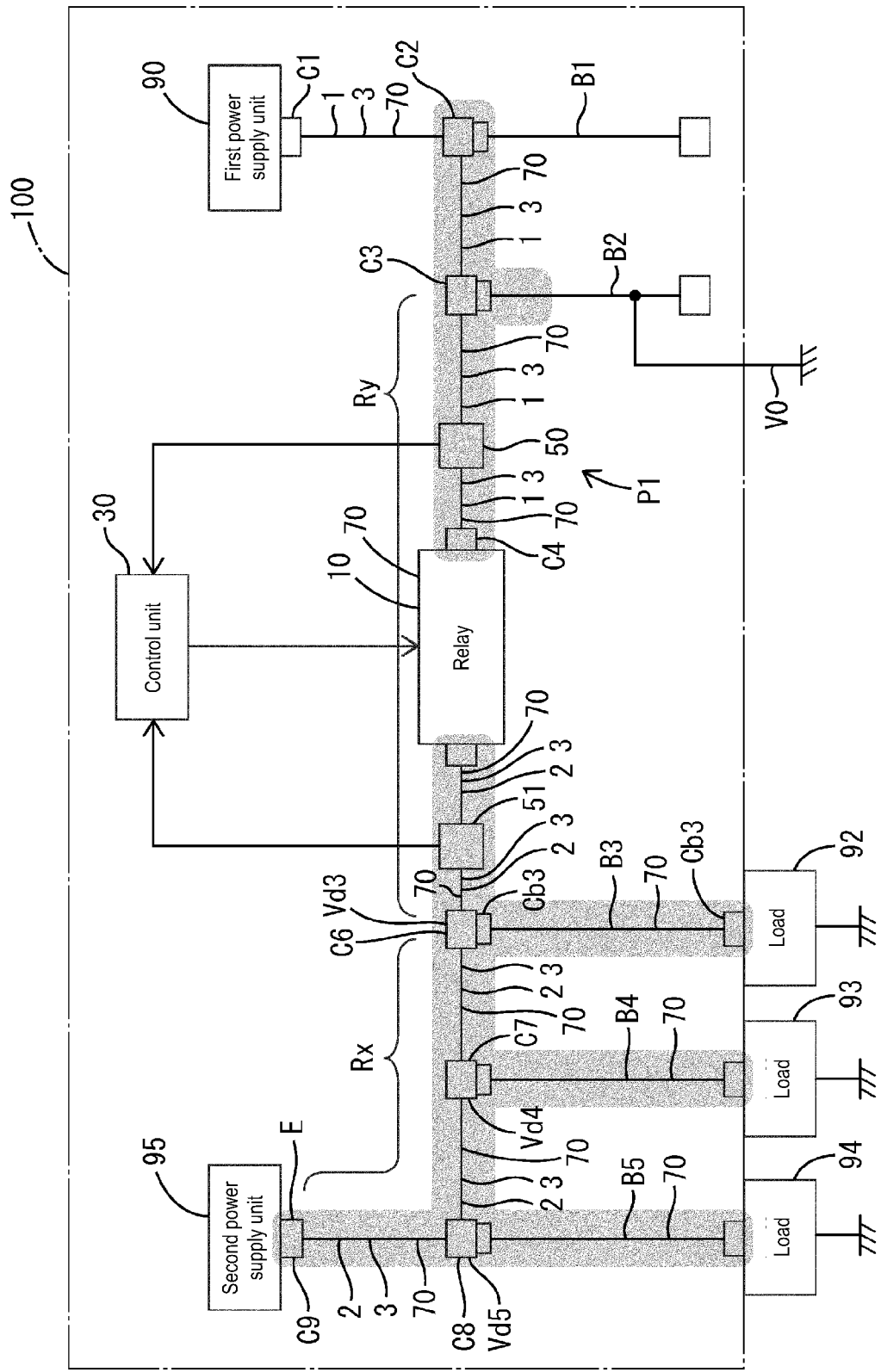
FIG. 3 is a schematic diagram depicting the configuration of a power supply system provided with the protector apparatus according to the first embodiment and depicts a state where a ground fault has occurred on a branch path that is electrically connected to a first connecting portion at a position closest to a load to be protected out of end portions that exclude a first connecting portion connected to a relay.

The first conductive path 1 and the second conductive path 2 both have a resistance component. Here, as depicted in FIG. 3, the first connecting portion C3 on the first conductive path 1, which is electrically connected to the branch path B2 on which the ground fault has occurred, is the end portion at a position closest to the load 92 out of the end portions in the protected region P1 that exclude the first connecting portion C4 electrically connected to the relay 10. Here, a resistance value of the resistance component of the power path 3 from the first connecting portion C3 to the second connecting portion C6 (that is, the second connecting portion to which the third connecting portion Cb3 on the branch path B3 is electrically connected, which is also the position where the load 92 is electrically connected on the second conductive path 2) is defined as a "first resistance value Ry". A resistance value of the resistance component of the power path 3 from the second connecting portion C9 electrically connected to the second power supply unit 95 to the second connecting portion C6 that is the position on the second conductive path 2 to which the load 92 is electrically connected is defined as a "second resistance value Rx". The ground potential V0 is assumed to be 0 (V), and the output voltage of the second power supply unit 95 is assumed to be E (V). In this case, the voltage Vd3 at the second connecting portion C6 (hereinafter also simply referred to as the "voltage Vd3") can be expressed as $Vd3=E*(Ry/(Rx+Ry))$. That is, the voltage Vd3 is a voltage obtained by dividing the output voltage of the second power supply unit 95 by the second resistance value Rx and the first resistance value Ry.

The magnitude of the guaranteed operating voltage of the load 92 is Vs1 (V). This means that in the above formula, the first resistance value Ry and the second resistance value Rx are values that result in the voltage Vd3 being equal to or greater than Vs1 (V) (that is, $Vd3 \geq Vs1$). By doing so, it becomes possible for the load 92 to continue operating as normal. That is, $E*(Ry/(Rx+Ry)) \geq Vs1$. Modifying this equation gives $Rx/Ry \leq (E-Vs1)/Vs1$. That is, when the first resistance value Ry and the second resistance value Rx satisfy this equation, the voltage Vd3 can be maintained at or above Vs1 (V) even when the voltage Vd3 sharply decreases from time T11 onward as depicted in FIG. 2. By doing so, the load 92 can continue operating as normal even when a ground fault occurs.

The control unit 30 compares the detection value corresponding to the first voltage V1 inputted from the first voltage detection unit 50 and the threshold stored in its own memory, and determines that the detection value is equal to or less than the threshold. At time T12, the control unit 30 then performs control to turn off the relay 10. This results in the relay 10 being turned off and to produce the cutoff state. By doing so, the voltage Vd3 becomes the same magnitude as the output voltage E (V) of the second power supply unit 95.

By keeping the voltage applied to the load 92 higher than Vs1 (V) in this way, the operation of the load 92 can continue without stopping, even when a ground fault has occurred on the branch path B2. This makes it unnecessary to consider how to shorten the time taken from time T11 to time T12, and thereby makes it unnecessary to use a relatively costly semiconductor relay, such as a MOSFET, for the relay 10.

Figure 4:
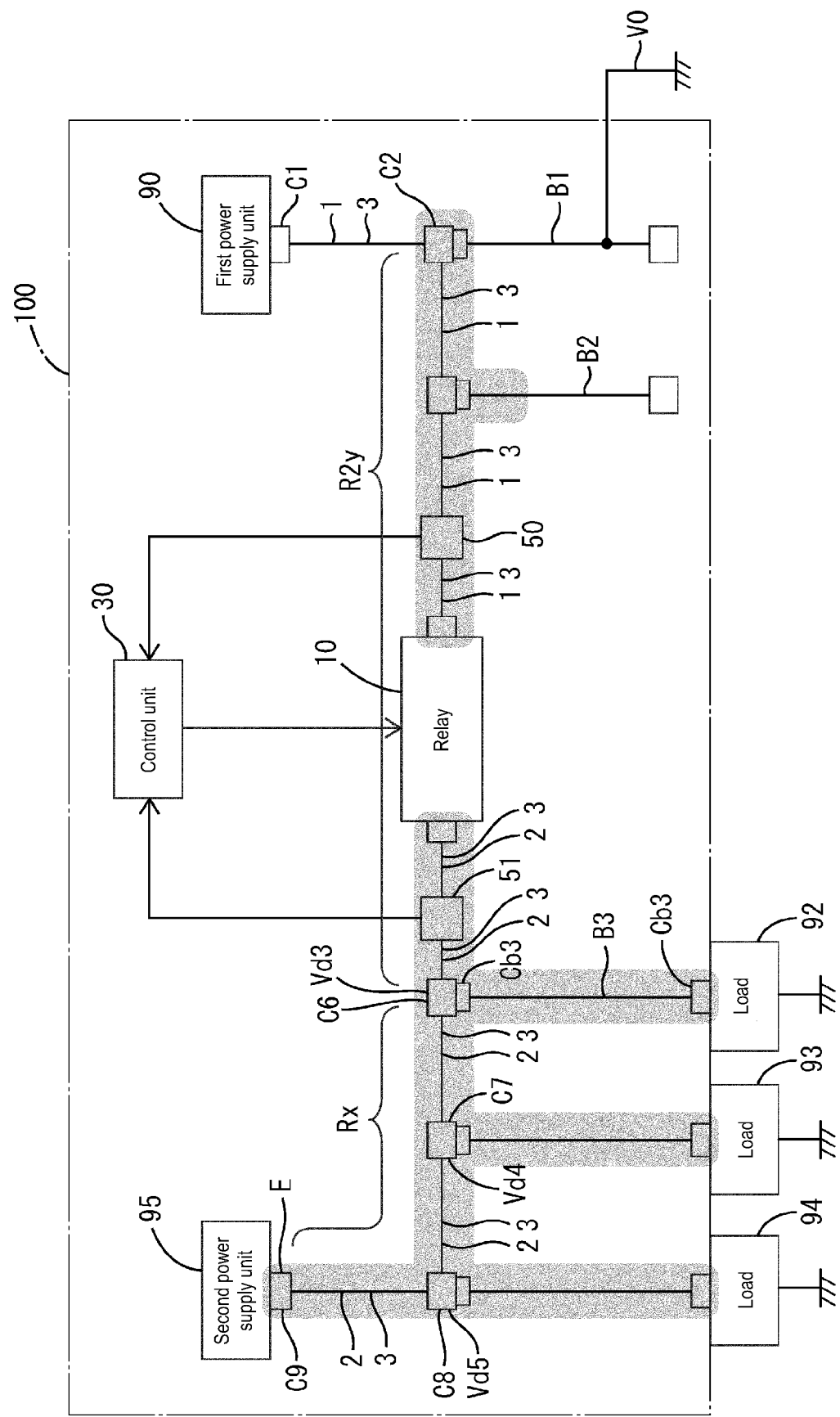
FIG. 4 is a schematic diagram depicting the configuration of a power supply system provided with the protector apparatus according to the first embodiment, and depicts a state where a ground fault has occurred on a branch path electrically connected to a first connecting portion at a position farthest from the load to be protected out of end portions that exclude the first connecting portion connected to the relay.

The first connecting portion C2 to which the branch path B1 is electrically connected is provided on the second conductive path 2 at a position that is further from the load 92 than the first connecting portion C3. This means that when the resistance value of the resistance component of the power path 3 from the first connecting portion C2 to the second connecting portion C6 is a first resistance value R2y, this first resistance value R2y will be larger than the first resistance value Ry (that is, Ry<R2y). Accordingly, as depicted in FIG. 4, when a ground fault has occurred on the branch path B1, the voltage Vd3 will be a voltage obtained by dividing the output voltage of the second power supply unit 95 by the second resistance value Rx and the first resistance value R2y. In this case, the value of the voltage Vd3 is greater than when a ground fault has occurred on the branch path B2.

That is, it is possible for the load 92 to operate continuously even when a ground fault occurs on the branch path B1 electrically connected to the first connecting portion C2 (or "end portion") that is further from the load 92 than the first connecting portion C3 (or "end portion") at a position closest to the load 92 out of the first connecting portions C2 and C3 (or "end portions") in the protected region P1 that exclude the first connecting portion C4 electrically connected to the relay 10.

On the second conductive path 2, the second connecting portion C7 is provided closer to the second power supply unit 95 than the second connecting portion C6, and the second connecting portion C8 is provided closer to the second power supply unit 95 than the second connecting portions C6 and C7. As depicted in FIG. 3, when a ground fault has occurred on the branch path B2, the voltage at the second connecting portion C7 is assumed to be a voltage Vd4 (hereinafter simply referred to as the "voltage Vd4"), and the voltage at the second connecting portion C8 is assumed to be a voltage Vd5 (hereinafter simply referred to as "voltage Vd5"). Here, for positions on the second conductive path 2, the closer the position to the second power supply unit 95, the larger the first resistance value Ry and the smaller the second resistance value Rx. This means that the voltage Vd4 is higher than the voltage Vd3, and the voltage Vd5 is higher than the voltages Vd3 and Vd4 (that is, Vd5>Vd4>Vd3). That is, when a ground fault has occurred on the first conductive path side, the applied voltage will increase the closer a second connecting portion is positioned to the second power supply unit 95.

Here, the magnitude of the guaranteed operating voltage of the load 93 is Vs2 (V), and the magnitude of the guaranteed operating voltage of the load 94 is Vs3 (V). When, in addition to the load 92, the loads 93 and 94 are also loads to be protected, the positions of the second connecting portions C6, C7, and C8 on the second conductive path 2 will change as appropriate in keeping with the magnitudes of the guaranteed operating voltages Vs1, Vs2, and Vs3 of the loads 92, 93, and 94. By doing so, the loads 92, 93, and 94 can continue operating even when a ground fault has occurred on the first power supply unit 90 side at a position aside from the protected region P1.

As one example, when Vs1(V)<Vs2(V)<Vs3(V), the load 94 with the highest guaranteed operating voltage (which is Vs3(V)) is electrically connected to the second connecting portion C8 that is closest to the second power supply unit 95. The load 93 with the second highest guaranteed operating voltage (Vs2 (V)) is electrically connected to the second connecting portion C7, which is further from the second power supply unit 95 than the second connecting portion C8 to which the load 94 is electrically connected. The load 92 with the lowest guaranteed operating voltage (Vs1(V)) is electrically connected to the second connecting portion C6 that is further from the second power supply unit 95 than the second connecting portions C7 and C8 to which the loads 93 and 94 are electrically connected. That is, when a plurality of loads to be protected are electrically connected to the second conductive path 2, a load to be protected with a higher guaranteed operating voltage is electrically connected to a second connecting portion that is closer to the second power supply unit 95 than a load to be protected with a lower guaranteed operating voltage. A load to be protected with a low guaranteed operating voltage is electrically connected to a second connecting portion that is further from the second power supply unit 95 than a load to be protected with a high guaranteed operating voltage.

Next, example effects of the present configuration will be described.

The protector apparatus 70 is used in a power supply system 100 that supplies power to the loads 92, 93, and 94. The protector apparatus 70 includes the power path 3 and the relay 10. The power path 3 includes the first conductive path 1, which is electrically connected to the first power supply unit 90, and the second conductive path 2, which is electrically connected to the second power supply unit 95. The relay 10 switches between the permitted state where conduction of electricity between the first conductive path 1 and the second conductive path 2 is permitted and a cutoff state in which such conduction is cut off. The first conductive path 1 is provided, in the protected region P1 which is a predetermined range from the relay 10 toward the first power supply unit 90, with first connecting portions C2 and C3 to which the branch paths B1 and B2 are detachably attached. The first connecting portions C2, C3, and C4 of the first conductive path 1 are entirely covered by the protector 40, and in the protected region P1, the protector 40 insulates the first conductive path 1 from the periphery of the protector 40. The load 92 (which is the load to be protected) out of the loads 92, 93, and 94 is electrically connected to the second conductive path 2.

The first conductive path 1 of the protector apparatus 70 is provided with detachable first connecting portions C2 and C3 in the protected region P1. The first connecting portions C2, C3, and C4 are entirely covered by the protector 40. In the protected region P1, the protector 40 insulates the first conductive path 1 from the periphery of the protector 40. This means that ground faults are prevented from occurring at the first connecting portions C2, C3, and C4, and it is easy to distance the location of potential ground faults from the load to be protected. This means that when a ground fault does occur on the first conductive path 1, the drop in the voltage applied to the load 92 (which is the load to be protected, which is connected to the second conductive path 2, due to the resistance component inherently present on the power path 3 is suppressed, which makes the load 92 less likely to stop operating.

The protected region P1 on the first conductive path 1 of the protector apparatus 70 is continuously covered by the protector 40.

According to this configuration, it is easy to prevent a ground fault from occurring in the protected region P1 and to distance the location of potential ground faults from the load 92. Accordingly when a ground fault does occur on the first conductive path 1, the drop in the voltage applied to the load 92, which is connected to the second conductive path 2, due to the resistance component inherently present on the power path 3 is suppressed, which makes the load 92 less likely to stop operating.

In the protector apparatus 70, the resistance value of the power path 3 from a position (the second connecting portion C6) on the second conductive path 2 where the load 92 (which is the load to be protected) is electrically connected to the first connecting portion C3 at the closest position to the load 92 out of the first connecting portions C2 and C3 in the protected region P1 excluding the first connecting portion C4 connected to the relay 10 is defined as the "first resistance value Ry". A resistance value of the power path 3 from the second power supply unit 95 to a position (the second connecting portion C6) where the load 92 is electrically connected to the second conductive path 2 is defined as the "second resistance value Rx". When the output voltage of the second power supply unit 95 is "E" and the guaranteed operating voltage of the load 92 is "Vs1", the first resistance value Ry and the second resistance value Rx satisfy Equation (1) below.

$$Rx/Ry \leq (E - Vs1)/Vs1 \qquad \text{Equation 1}$$

In the protector apparatus 70, even when a ground fault has occurred at the connecting portion C3, which is at a position closer to the load 92 (the "load to be protected") out of the first connecting portions C2 and C3 in the protected region P1 excluding the first connecting portion C4 connected to the relay 10, the voltage applied to the load 92 will be equal to or higher than the guaranteed operating voltage (Vs1 (V)) of the load 92. This means that the protector apparatus 70 makes it unlikely for the operation of the load 92 to stop operating.

The second conductive path 2 of the protector apparatus 70 is provided from the second power supply unit 95 to the relay 10, and the second connecting portions C5, C6, C7, C8, and C9, which are detachable, are covered by the protector 40. The protector apparatus 70 includes the branch paths B3, B4, and B5, which electrically connect the loads 92, 93, and 94 and the second connecting portions C6, C7, and C8. On these branch paths B3, B4, and B5, the third connecting portions Cb3, Cb4, and Cb5 that are electrically connected to the loads 92, 93, and 94 are also covered by the protector 40. With this configuration, the protector apparatus 70 preferentially protects the second connecting portions C5, C6, C7, C8, and C9 on the second conductive path 2 that are susceptible to ground faults. Together with this, the protector apparatus 70 also preferentially protects the third connecting portions Cb3, Cb4, and Cb5 on the branch paths B3, B4, and B5 that are electrically connected to the loads 92, 93, and 94. By doing so, it is possible to favorably suppress the occurrence of ground faults on the second conductive path 2 side.

The relay 10 of the protector apparatus 70 is a mechanical relay. With this configuration, even when a ground fault occurs, the protector apparatus 70 will likely keep the load 92 (which is the load to be protected) operating continuously without stopping. It is therefore possible to use a mechanical relay, whose operation is slower than a semiconductor relay, as the relay 10, which suppresses an increase in cost.

Second Embodiment

Figure 5:
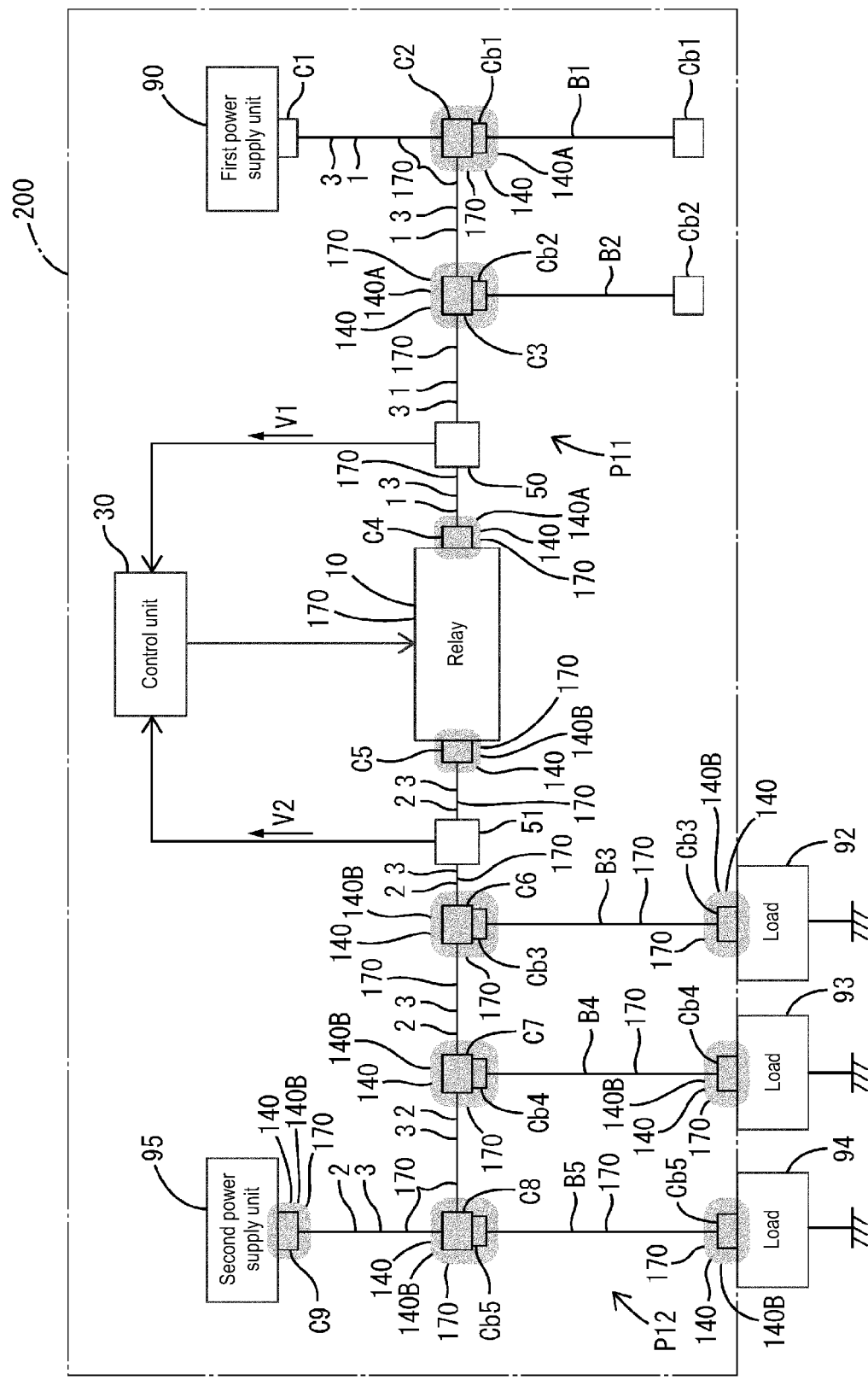
FIG. 5 is a schematic diagram depicting the configuration of a power supply system provided with a protector apparatus according to a second embodiment.

A vehicle-mounted system 200 including a protector apparatus 170 according to a second embodiment of the present disclosure will now be described with reference to FIG. 5. The protector apparatus 170 according to the second embodiment differs from the first embodiment in the form of first protectors 140A and second protectors 140B of a protector 140. Configurations that are the same as the first embodiment have been assigned the same reference numerals and description of structures that are the same as in the first embodiment and of operations and effects that are the same as the first embodiment is omitted.

The protector 140 includes the first protectors 140A and the second protectors 140B. The first protectors 140A and the second protectors 140B are made of synthetic resin. The first protectors 140A partially cover a protected region P11 that is a region including the first connecting portion C4 connected to the relay 10 and the first connecting portions C2 and C3 connected to the branch paths B1 and B2 and is a predetermined range from the first connecting portion C4 toward the first power supply unit 90. In the protected region P11 at positions where the first protector 140A is provided, the first protector 140A insulates the first conductive path 1 from the periphery of the first protector 140A. In the protected region P11 at positions where the first protector 140A is not provided, a covering provided on the wires forming the first conductive path 1 and the branch path B1 insulates the wires of the first conductive path 1 and the branch path B1 from the periphery of the covering.

The second protector 140B partially covers the second connecting portions C5, C6, C7, C8 and C9 and the third connecting portions Cb3, Cb4 and Cb5 that are electrically connected to the loads 92, 93 and 94 as a protected region P12. In this protected region P12 at positions where the second protector 140B is provided, the second protector 140B insulates the second conductive path 2 from the periphery of the second protector 140B. In the protected region P12 at positions where the second protector 140B is not provided, a covering provided on the electric wires that construct the first conductive path 1 and the branch paths B3, B4, and B5 insulates the electric wires of the first conductive path 1 and the branch paths B3, B4, and B5 from the periphery of the covering.

The protector apparatus 170 is used in the vehicle-mounted system 200 that supplies power to the loads 92, 93, and 94. The protector apparatus 170 includes the power path 3 and the relay 10. The power path 3 includes the first conductive path 1 that is electrically connected to the first power supply unit 90 and the second conductive path 2 that is electrically connected to the second power supply unit 95. The relay 10 switches between a permitted state in which conduction of electricity between the first conductive path 1 and the second conductive path 2 is permitted and a cutoff state in which conduction is cut off. In the protected region P11, which is a predetermined range from the relay 10 toward the first power supply unit 90 side, the first conductive path 1 is provided with first connecting portions C2 and C3 to which the branch paths B1 and B2 are detachably attached. The first connecting portions C2, C3, and C4 of the first conductive path 1 are entirely covered by the protector 140, and in the protected region P11, the protector 140 insulates the first conductive path 1 from the periphery of the protector 140. The load 92 (which is the load to be protected) out of the loads 92, 93, and 94 is electrically connected to the second conductive path 2.

The first conductive path 1 of the protector apparatus 170 is provided with detachable first connecting portions C2 and C3 in the protected region P11. The first connecting portions C2, C3, and C4 are entirely covered by the protector 140. In the protected region P11, the protector 140 insulates the first conductive path 1 from the periphery of the protector 140. This means that ground faults are prevented from occurring at the first connecting portions C2, C3, and C4, and it is easy to distance the location of potential ground faults from the load to be protected. This means that when a ground fault does occur on the first conductive path 1, the drop in the voltage applied to the load 92, which is connected to the second conductive path 2, due to the resistance component inherently present on the power path 3 is suppressed, which makes the load 92 less likely to stop operating.

OTHER EMBODIMENTS

Note that all features of the embodiments disclosed here are exemplary and should not be regarded as limitations on the present disclosure. The scope of the present disclosure is indicated by the range of the patent claims, not the description given above, and is intended to include all changes within the meaning and scope of the patent claims and their equivalents.

Although the control unit 30 is mainly composed of a microcomputer in the first embodiment, the control unit 30 may be realized by a plurality of hardware circuits aside from a microcomputer. In addition, at least one of a failure detection apparatus and a detection unit may be provided separately from the control unit.

Unlike the first embodiment, a load may be connected to the branch path that is electrically connected to the first conductive path. When doing so, the load connected to the first conductive path cannot be set as a load to be protected.

Although the output voltages of the first power supply unit 90 and the second power supply unit 95 are described as being 12V in the first embodiment, the output voltages of the first power supply unit and the second power supply unit are not limited to this. The output voltages of the first power supply unit and the second power supply unit may also respectively differ.

Unlike the first embodiment, the relay may be covered by a protector. As one example, the protector may continuously cover a range from the first conductive path to the second conductive path.

The invention claimed is:

1. A protector apparatus to be used in a power supply system that supplies power to loads, comprising:
 a power path including a first conductive path, which is electrically connected to a first power supply unit, and a second conductive path, which is electrically connected to a second power supply unit; and a cutoff unit that switches between a permitted state where conduction of electricity between the first conductive path and the second conductive path is permitted and a cutoff state where the conduction is cut off, wherein the first conductive path is provided with a first connecting portion in a protected region, which is a predetermined range from the cutoff unit toward the first power supply unit, the first connecting portion is entirely covered by a protector, and in the protected region, the protector insulates the first conductive path from a periphery of the protector, out of the loads, a load to be protected is electrically connected to the second conductive path, and wherein when a resistance value of the power path from a position where the load to be protected is electrically connected to the second conductive path to an end portion that is closest to the load to be protected, out of end portions in the protected region that exclude the first connecting portion connected to the cutoff unit, is a first resistance value Ry, a resistance value of the power path from the second power supply unit to a position where the load to be protected is electrically connected on the second conductive path is a second resistance value Rx, the output voltage at the second power supply unit is E, and a guaranteed operating voltage of the load to be protected is Vs, the first resistance value Ry and the second resistance value Rx satisfy Equation 1 below:

$$Rx/Ry \leq (E - Vs)/Vs.$$

2. The protector apparatus according to claim 1, wherein the protected region of the first conductive path is continuously covered by the protector.

3. The protector apparatus according to claim 1,
wherein a part of the second conductive path from the second power supply unit to a second connecting portion provided before the cutoff unit is covered by the protector, the second conductive path includes a branch path that electrically connects the load to be protected and the second connecting portion, and the branch path has a third connecting portion that is electrically connected to the load to be protected and is covered by the protector.

4. The protector apparatus according to claim 1, wherein the cutoff unit is a mechanical relay.

5. The protector apparatus according to claim 2,
wherein a part of the second conductive path from the second power supply unit to a second connecting portion provided before the cutoff unit is covered by the protector, the second conductive path includes a branch path that electrically connects the load to be protected and the second connecting portion, and the branch path has a third connecting portion that is electrically connected to the load to be protected and is covered by the protector.

6. The protector apparatus according to claim 2, wherein the cutoff unit is a mechanical relay.

7. The protector apparatus according to claim 3, wherein the cutoff unit is a mechanical relay.

* * * * *